United States Patent [19]
Haruta et al.

[11] Patent Number: 6,013,714
[45] Date of Patent: Jan. 11, 2000

[54] RESIN COMPOSITION AND FIBROUS MATERIAL FORMING MOLD

[75] Inventors: Yuichi Haruta; Hideaki Takase; Tsuyoshi Watanabe; Takashi Ukachi, all of Ibaraki, Japan

[73] Assignees: DSM N.V., Heerlen, Netherlands; JSR Corporation; Japan Fine Coatinss Co., Ltd., both of Tokyo, Japan

[21] Appl. No.: 08/934,126

[22] Filed: Sep. 19, 1997

[30] Foreign Application Priority Data

Sep. 20, 1996 [JP] Japan .................................. 8-250585

[51] Int. Cl.⁷ ..................................................... C08K 3/00
[52] U.S. Cl. ......................... 524/492; 523/210; 523/216; 524/493
[58] Field of Search ..................... 524/492, 493; 523/210, 216

[56] References Cited

U.S. PATENT DOCUMENTS

| | | | |
|---|---|---|---|
| 4,139,655 | 2/1979 | Tsao | 427/44 |
| 4,156,035 | 5/1979 | Tsao | 427/44 |
| 5,296,335 | 3/1994 | Thomas | 430/320 |
| 5,434,196 | 7/1995 | Ohkawa | 522/100 |
| 5,679,722 | 10/1997 | Tamura | 522/96 |

FOREIGN PATENT DOCUMENTS

| | | |
|---|---|---|
| 0 535 838 A1 | 4/1993 | European Pat. Off. . |
| 0 732 181 A1 | 9/1996 | European Pat. Off. . |
| 49-17040 | 2/1974 | Japan . |
| 50-151996 | 12/1975 | Japan . |
| 50-151997 | 12/1975 | Japan . |
| 50-158680 | 12/1975 | Japan . |
| 50-158698 | 12/1975 | Japan . |
| 52-30899 | 3/1977 | Japan . |
| 55-125105 | 9/1980 | Japan . |
| 56-8428 | 1/1981 | Japan . |
| 55-55420 | 5/1981 | Japan . |
| 56-149402 | 11/1981 | Japan . |
| 57-192429 | 11/1982 | Japan . |

OTHER PUBLICATIONS

Japanese Patent Abstract, vol. 14, No. 261 (c–0725), Mar. 15, 1990.

*Primary Examiner*—Edward J. Cain
*Attorney, Agent, or Firm*—Pillsbury Madison & Sutro

[57] ABSTRACT

Process for the manufacture of a mold for making products from fibrous materials by performing a combination of steps of (1) applying a thin layer of resin on a supporting stage
(2) selectively irradiating the thin layer of resin as to cure a selected part of said resin
(3) applying a further thin layer of resin, and repeating steps (2) and (3) as to obtain a three dimensional shape of a plurality of cured layers, optionally combined with either one of the steps of washing and post-curing the three dimensional shape, as to obtain the mold, wherein the resin ocmpositiona is formulated from constituents comprises at least one photoreaction monomer at least one photoinitiator at least one filler.

8 Claims, 3 Drawing Sheets

RESIN COMPOSITION AND FIBROUS MATERIAL FORMING MOLD

FIELD OF THE INVENTION

This invention relates to a mold for making products from fibrous materials, (i.e. a mold for pulp molding) and a resin composition suited for the manufacture of such a mold.

BACKGROUND OF THE INVENTION

Several methods are known to make products or articles from fibrous materials. One of these methods comprises the step of forming an article or a preform therefor, from pulp fiber with the use of a mold, which is also called pulp molding. Pulp molding is attracting increased attention from the point of view of resource saving and environmental protection by recycling, since various materials such as packaging materials can be made from used paper products.

In an example of the pulp molding process, a raw pulp suspension is prepared by dispersing pulp fibers in water to obtain a suspension and adding a thermosetting resin to the suspension to impregnate the pulp fibers with the thermosetting resin. Next, the method comprises a step in which the mold is contacted with the raw pulp suspension and the pressure is reduced inside the mold (metal mold). Since the mold is made so as to admit the passage of water from the raw pulp suspension, the pulp fibers accumulate over the surface of the mold. In this way a pulp fiber preform is formed which is then dried and subjected to pressure and/or elevated temperature to obtain the molded pulp product.

FIG. 1 is a schematic sectional view of a mold used in pulp molding. In FIG. 1, a mold 50 is a so-called draining mold. The mold 50 comprises a mold main body 58 in the shape of a hollow rectangular parallelepiped with a projection, which consists of three division molds (58A to 58C) each made from cast metal, and a lid 53 for closing an opening 52 of the mold main body 58.

The mold main body 58 (division molds 58A to 58C) has a plurality of suction holes 56 which provide communication between the inside space 51 and the outside of the mold. The outside surface of the mold main body 58 (division molds 58A to 58C) is covered with wire cloth 57A to 57C. The diameter of the suction holes 56 is within a range of about 2 to 15 mm. The size of the openings of the wire cloth 57A to 57C (size of the particles which can pass through the wire cloths) is within a range of about 0.1 to 1 mm.

A suction device 54 is connected to the mold 58 with a suction pipe 55. By operating the suction device 54, a reduced pressure is produced in the inside space 51 of the mold 58.

FIG. 2 illustrates the process step in which the mold 50 is contacted with the pulp suspension to make a pulp fiber preform. In FIG. 2, a raw pulp suspension 60, in which pulp fibers of a few millimeters in length are dispersed in water, is held in a raw material vat 59.

The main body 58 of the mold 50 is put in the raw pulp suspension 60. The suction device 54 is then operated to reduce the pressure of the inside space 51 of the mold main body 58. Because of this reduced pressure in the inside space 51, a suction force which attracts the pulp fibers is generated on the outside surface (the surface covered with the wire cloth 57A to 57C) of the mold main body 58. Being pulled beg this force, the pulp fibers accumulate over the outside surface of the mold main body 58, and thereby the preform of the product is obtained. This preform is then subjected to several process steps such as drying and curing under pressure. Thereby, a molded product is obtained, which has a shape corresponding to that of the mold 50.

However, since the mold 50 shown in FIG. 1 needs a wire mesh stretching operation to cover the outside surface of the mold main body 58 (division molds 58A to 58C) with the wire cloths 57A to 57C, it cannot be manufactured efficiently.

The wire mesh stretching operation is very difficult when stretching wire mesh along the surface of a mold which has complicated projections end recessions. Further, when the mold consists of two or more parts, each part needs a separate wire mesh stretching operation, making the wire mesh stretching operations still more complicated and difficult. The wire mesh stretching operation also requires skill in cutting and stretching the wire mesh. Furthermore, it is difficult to quickly meet a request for design change, because remake of the metal mold is required even for a partial change in the shape of the mold.

It is therefore an object of the present invention to manufacture a mold using so-called "laminate fabricating" in which consecutive layers of a resin are irradiated with light to cure the resin (hereinafter referred to as light-irradiating laminate fabricating). Light-irradiating laminate fabricating is the method of forming a three-dimensional object composed of a plurality of firmly united superposed layers of cured resin by repeating the process of selectively irradiating a photocurable resin with light. For this light-irradiating laminate fabricating, photocurable resins such as urethane acrylate, epoxy acrylate, a vinyl ether resin, and an epoxy resin are used.

With the use of light-irradiating laminate fabricating, suction holes can be formed by aligning unexposed parts of all laminated resin layers so that when the uncured resin is removed continuous holes are apparent. It is therefore possible to form suction holes of any diameter by light-irradiating laminate fabricating. For example, suction holes with a diameter smaller than the length of the pulp fibers (1 mm or smaller, for example) can be easily formed. Suction holes with such a small diameter perform both the function of the suction holes 56 of the mold 50 shown in FIG. 1, and that of the wire cloths 57A to 57C. Therefore, the wire mesh stretching operation which requires time and skill becomes unnecessary. Further, even a complicated-shape mold can be made in a single mold without dividing it. It was therefore expected that the manufacture of a mold for pulp molding would become more efficient, and a quicker response to requests for design change would become possible, by use of light-irradiating laminate fabricating.

It is a further object of the present invention to form a water-resistant coating over the surface of the laminate fabricated mold made of cured resin in order to minimize water permeation, improve the durability and extend the useful life of the mold.

It is yet another object of the present invention to provide a fibrous material forming mold for forming products from fibrous materials which can be manufactured efficiently, without a post-care coating step, while still having superior water-resistant properties (durability).

It is yet a further object of the present invention to form a water-resistant laminate Fabricated mold for forming products from fibrous materials wherein the mold comprises a water-resistant, cured resin that minimizes water permeation, improves the durability and extends the useful life of the mold.

It is still a further object of the present invention to provide a water-resistant mold for making products from fibrous materials wherein the mold is formed from a filled resin that is water-resistant.

SUMMARY OF THE INVENTION

The resin composition of this invention is a radiation curable resin composition used for making a fibrous material forming mold by laminate fabricating and is characterized in that the resin comprises a liquid constituent and a filler dispersed in the liquid, the liquid constituent comprises at least a photoreactive monomer and a photoreaction initiator.

Preferable constituents for the resin composition of this invention are as follows:

(1) The filler is an inorganic substance.
(2) The filler is in the form of spherical particles.
(3) The filler content of the resin composition is 30 to 80 wt %, and preferably 50 to 70 wt %
(4) An epoxy compound is used as the photoreactive monomer.
(5) The resin composition comprises (A) a cationic polymerizable organic compound, (B) a cationic photopolymerization initiator, (C) an ethylenically unsaturated monomer, (D) a radical photopolymerization initiator, and (E) the filler.

The fibrous material forming mold of this invention is characterized in that it is obtained by repeating the process which selectively irradiates the resin composition of this invention with radiant energy to form a layer of cured resin.

The fibrous material forming mold of this invention is a mold used for molding fibrous material with a freeness value within the range of 400 to 600 ml and length of fibers within the range of about: 0.3 to 3 mm. This mold preferably has suction holes 3 mm or smaller in diameter.

A mold (the fibrous material forming mold of his invention) with a plurality of suction holes of desired diameter (3.6 mm or smaller, for example) can be easily and efficiently manufactured by repeating the process which selectively irradiates a thin layer of the resin composition covering the previous layer with radiant energy to form a laminated layer of cured resin. Specifically, since the suction holes of the fibrous material forming mold of this invention perform both the function of the suction holes (producing a suction force which moves pulp fibers toward the surface of the mold) and that of the wire cloth (holding pulp fibers on the surface of the mold without admitting their passage) of a conventional draining mold, the wire mesh stretching operation which requires time and skill becomes unnecessary. A complicated-shape mold can be made in a single mold without it being divided. This enables a quicker response to requests for design changes.

The cured resin obtained from the resin composition of this invention appears to have high water-resistant properties. Therefore, a mold made of the cured resin obtained from the resin composition of this invention (fibrous material forming mold of this invention) retains the strength required for molding a fibrous material if put in a liquid with a fibrous material dispersed for a long time, and hence this mold can adequately endure repeated use over a long period.

DETAILED DESCRIPTION OF THE INVENTION AND PREFERRED EMBODIMENTS

Figure 1:
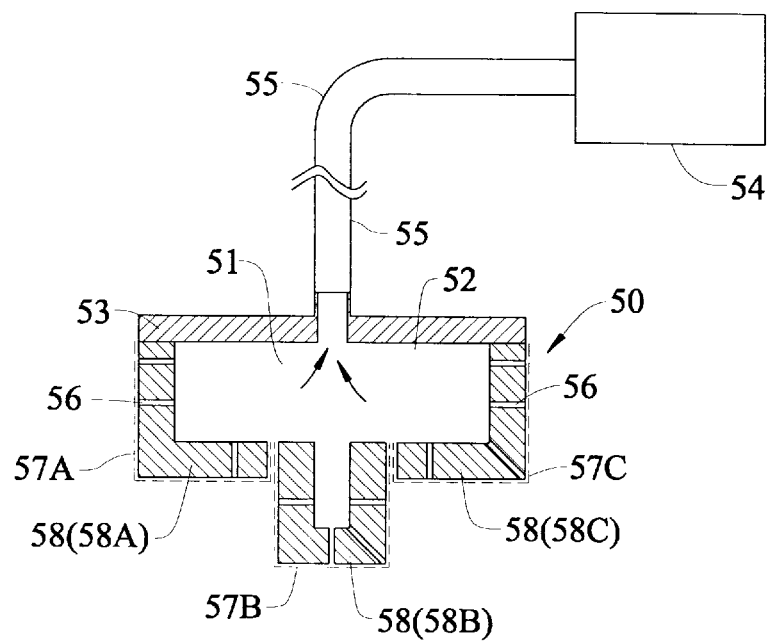
FIG. 1 is a diagrammatic sectional view of a mold used for pulp molding.
Figure 2:
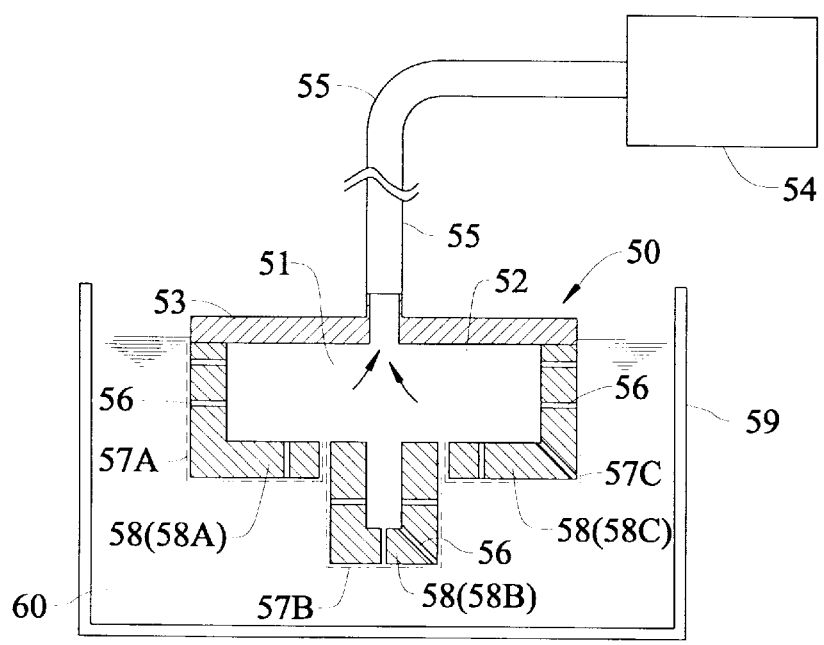
FIG. 2 is a diagram showing the use of the mold of FIG. 1.

This invention is described in detail below.

Resin Composition

The resin composition of this invention is a radiation (hereinafter referred to as light or photo)-curable resin composition used for manufacturing a fibrous material forming mold by laminate fabricating using irradiation with light (hereinafter also referred to as optical fabricating). This resin composition contains a filler (solid component) dispersed in the liquid constituent comprising a photoreactive monomer, and a photoinitiator.

The resin composition of this invention preferably is a liquid composition which contains (E) a filler dispersed in the liquid constituent comprising (A) a cationic polymerizable organic compound, (B) a cationic photopolymerization initiator, (C) an ethylenically unsaturated monomer, and (D) a radical photopolymerization initiator. Hereinafter, the constituents of this resin composition are specifically described.

(A) Cationic Polymerizable Organic Component

Cationic polymerizable organic component (hereinafter also referred to as the component (A)) as a constituent of the resin composition of this invention is an organic compound which polymerizes or cross-links in the presence of a cationic polymerization initiator when irradiated with light. Examples of such a cationic polymerizable organic compound, include epoxy compounds, octane compounds, oxolane compounds, cyclic acetal compounds, cyclic lactone compounds, thiirane compounds, thietane compounds, vinyl ether compounds, spiro ortho ester compounds produced by the reaction of an epoxy compounds and lactone, ethylenically unsaturated compounds, cyclic ether compounds, cyclic thioether compounds, and vinyl compounds. Among these compounds, an epoxy compound is preferred because the curing rate of the prepared resin composition is high, and the cured resin obtained from the resin composition has good mechanical properties.

Epoxy compounds which can be used as the component (A) include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisephenol S diglycidyl ether, 3,4-epoxycyclohexylmethyl-3',4'-epoxycyclohexlne carboxylate, 2-(3,4-epoxycyclohexyl-5,5-spiro-3,4-epoxy) cyclohexane-metha-dioxane, bis(3,4-epoxycyclohexylmethyl) adipate, vinylcyclohexene oxide, 4-vinylepoxycyclohexane, bis(3,4-epoxy-6-methylcyclohexyl-methyl) adipate, 3,4-epoxy-6-methylcyclohexyl-3',41-epoxy-6'-methyl cyclohexane carboxylate, methylenebis(3,4-epoxycyclohexane), dicyclopentadiene diepoxide, ethylene glycol di(3,4-epoxycyclohexylmethyl) ether, ethylene bis(3,4-epoxycyclohexanecarboxylate), epoxyhexahydrodioctyl phthalate, epoxyhexahydrophthialic acid di-2-ethylhexyl, 1,4-butanediol diglycidyl etler, 1,6-hexanediol diglycidyl ether, glycerol triclycidyl ether, trimethylolpropane triglycidyl ether, polyethylene glycol diglycidyl ether, polypropylene glycol diglycidyl ether; polyglycidyl ether of: polyether polyol obtained by adding one or more kinds of alkylene oxide to an aliphatic polyhydric alcohol such as ethylene glycol, propylene glycol, and glycerol; diglycidyl ester of an aliphatic head chain dibasic acid; mono glycidyl ether of aliphatic higher alcohol; phenol, cresol, and butyl phenol and a monoglycidyl ether of the polyether alcohol obtained by adding an alkylene oxide to these; glycidyl ester of a higher fatty acid; epoxidated soybean oil, epoxy stearic acid butyl, epoxy stearic acid octyl, epoxidated linseed oil, and epoxidated polybutadiene, for example.

Among these compounds, bisphenol A diglycidyl ether, bisphenol F diglycidyl ether, hydrogenated bisphenol A diglycidyl ether, hydrogenated bisphenol F diglycidyl ether, 3,4-epoxycyclohexylmethyl-3',4'-epoxycyclohexane carboxylate, bis(3,4-epoxycyclohexylmethyl) adipate, 1,4-butanediol diglycidyl ether, 1,6-hexanediol diglycidyl ether, glycerol triglycidyl ether, trimethylolpropane triglycidyl ether, polyethylene glycol diglycidyl ether, and polypropylene glycol diglycidyl ether are preferred.

Epoxy compounds especially preferable as component (A) include those which have two or more alicyclic epoxy groups in one molecule, such as 3,4-epoxycyclohexylmethyl-3',4'-epoxycyclohexane carboxylate, and bis(3,4-epoxycyclohexylmethyl) adipate. When this type of epoxy compound is present in an amount equal to or greater than 50 wt % in component (A), the polymerization rate (curing rate) of the prepared resin composition increases, and the time needed for laminate fabricating can be reduced. Further, the shrinkage upon cure of the three-dimensional product (mold) made of such a resin composition decreases, resulting in a smaller dimensional change of the mold over time.

Compounds other than epoxy compounds which can be used as component (A) include for example octane compounds such as trimethylene oxide, 3,3-dimethyl octane, 3,3-dichloro methyl octane, 3-ethyl-3-phenoxy methyl octane, and bis(3-ethyl-3-methyloxy) butane; oxolane compounds such as tetrahydrofuran and 2,3-dimethyl tetrahydrofuran; cyclic acetal compounds such as trioxane, 1,3-dioxolane, and 1,3,6-trioxane cyclooctane; cyclic lactone compounds such as β-propyolactone, ε-caprolactone; thiamine compounds such as ethylene sulfide, 1,2-propylene sulfide, and thioepichlorohydrin; thietane compounds such as 3,3-dimethylthietane; vinyl ether compounds such as ethylene glycol divinyl ether, triethylene glycol divinyl ether, and trimethylolpropane trivinyl ether; spiro orthoester compounds obtained by the reaction of an epoxy compound and lactone; ethylenically unsaturated compounds such as vinyl cyclohexane, isobutylene, and polybutadiene; and derivatives of the above compounds.

Examples of commercially available cationic polymerizable organic compounds include UVR-6100, UVR-6105, UVR-6110, UVR-6128, UVR-6200, and UVR-6216 (Union Carbide Corp.); Celoxide 2021, Celoxide 2021P, Celoxide 2081, Celoxide 2083, Celoxide 2085, Celoxide 2000, Celoxide 3000, Glycidole, AOEX24, Cyclomer A200, Cyclomer M100, Epolead GT-300, Epolead GT-301, Epolead GT-302, Epolead GT-400, Epolead 401, and Epolead 403 (Daicel Co., Ltd.); Epicoat 828, Epicoat 812, Epicoat 1031, Epicoat 872, and Epicoat CT508 (Yuka Shell Company); KRM-2100, KRM-2110, KRM-2199, KRM-2400, KRM-2410, KRM-2408, KRM-2490, KRM-2200, KRM-2720, KRM-2750 (Asahi Denka Kogyo K.K.); Rapi-Cure DVE-3, CHVE, and PEPC (ISP Company); and VECTOMER 2010, 2020, 4010, and 4020 (Allied Signal Company).

The above cationic polymerizable compounds can be used singly or in combinations of two or more to prepare component (A).

The component(A) content of the liquid constituent of the resin composition of this invention is within the range of 30 to 95 wt %, preferably 40 to 90 wt %, and more preferably 50 to 85 wt %. If the amount of the component (A) is too small, the dimensional accuracy of the three-dimensional product (mold) made of the prepared resin composition can decrease. Further, the three-dimensional product (mold) is apt to deteriorate over time. If the amount of the component (A) is too large, the photocuring property of the resin prepared composition decreases, sometimes causing a decrease in efficiency of the laminate fabricating process.

(B) Cationic Photopolymerization Initiator

The cationic photopolymerization initiator (hereinafter also referred to as the component (B)) of the resin composition of this invention is a compound that can release a substance which initiates cationic polymerization of the above described component (A) when irradiated with for example UV or visible light. An especially preferable compound for the component (B) is as onium salt represented by the following general formula. This onium salt is a compound which releases a Lewis acid.

$$[R^1_a R^2_b R^3_c R^4_d Z]^{+m}[MX_n]^{-m} \qquad (1)$$

(In the above formula, the cation is onium; Z represents S, Se, Te, P, As, Sb, Bi, 0, I, Br, Cl, or N≡N; and $R^1$, $R^2$, $R^3$ and $R^4$ represent the same or different organic acid. a, b, c, and d are each an integer from 0 to 3, (a+b+c+d) being equal to the valence of Z. M represents a metal or metalloid that is the central atom of the halide complex; B, P As, Sb, Fe, Sn, Bi, Al, Ca, In, Ti, Zn, Sc, V, Cr, Mn, and Co, for example. X represents a halogen. m is the net electric charge of the halide complex ion. n is the number of halide atoms in the halide complex ion.

Examples of the anion ($MX_n$) in the above general formula include tetrafluoroborate ($BF_4^-$), hexafluorophosphate ($PF_6^-$), hexafluoroantimonzite ($SbF_6^-$), hexafluoroarsenate ($AsF_6^-$), and hexachloroant monate ($SbCl^-$).

In addition, onium salts having an anion represented by a general formula $[MX_n(OH)^-]$ can be used. Further, onium salts having other anions such as perchloric acid ion ($ClO_4^-$), trifluoromethane sulfonic acid ion ($CF_3SO_3^-$), fluorosulfone acid ion ($FSO_3^-$), toluene sulfonic acid ion, trinitrobenzene sulfonic acid ion, and trinitrotoluene sulfonic acid ion can also be used.

Among these onium salts, an onium salt especially effective as the component (B) is an aromatic onium salt. Further, especially preferred onium salts include an aromatic halonium salt disclosed in Japanese Patent Applications Laid-Open No. 151996/1975, No. 158680/1975; VIA group aromatic onium salt disclosed in Japanese Patent Applications Laid-Open No. 151997/1975, No. 30899/1977, No. 55420/1981, and No. 125105/1980; VA group aromatic onium salt disclosed in Japanese Patent Application Laid-Open No. 158698/1975; oxosulfoxonium salt disclosed in Japanese Patent Applications Laid-Open No. 8428/1981, No. 149402/1981, and No. 192429/1982; aromatic diazonium salt disclosed in Japanese Patent Application Laid-Open No. 17040/1979; and thiopyrylium salt disclosed by U.S. Pat. No. 4,139,655. An Iron/allene complex and aluminum complex/photolysis silicon compound initiator can also be used.

Commercially available cationic photopolymerization initiators that can be preferably used as the component (B)

include UVI-6950, UV:E-6970, UVI-6974, and UVI-6990 (Union Carbide Corp.); Adekaoptomer SP-150, SP-151, SP-170, and SP-17 (Asahi Denka Kogyo K. K.); Irgacure 261 (Ciba Geigy); CI-2481, CI-2624, CI-2639, and CI-2064 (Nihon Soda Co., Ltd.); CD-1010, CD-1011, and CD-1012 (Satomer Co., Ltd.); DTS-102, DTS-103, NAT-103, NDS-103, TPS-103, MDS-103, MPI-103, and BBI-103 (Green Chemical Co., Ltd.). Among these, UVI-6970, UVI-6974, Adeka Optomer SP-170, SP-171, CD-1012, and MPI-103 are especially preferable, because they impart a high photocuring sensitivity to the prepared resin composition.

The above cationic photopolymerization initiators may be used singly or in combinations of two or more to prepare the component (B).

The component (B) content of the liquid constituent of the resin composition of this invention is within the range of 0.1 to 10 wt %, preferably 0.2 to 5 wt %, and more preferably 0.3 to 3 wt %. If the amount of the component (B) is too small, the photo-curing property of the prepared resin composition becomes too low, and the three-dimensional products (mold) made of the resin composition may not have adequate mechanical strength. If the amount of the component (B) is, too large, the prepared resin composition does not have adequate light transparent properties required for the optical fabricating. As a result, mechanical st strength such as the tenacity of the products (molds) made of the resin composition becomes too low.

(C) Ethylenically Unsaturated Monomer

The ethylenically unsaturated monomer (C) (herein referred to as the component (C)) of the resin composition of this invention is a compound which has one or more ethylenically unsaturated groups. Mono-functional monomers with one ethylenically unsaturated group in the molecule and poly-functional monomers with more than one-ethylenically unsaturated group can be used as the component (C).

Mono-functional monomers which can be preferably used for the component (C) are acrylamide, (meth)acryloyl morpholine, 7-amino-3,7-dimethyloctyl (meth)acrylate, isobutoxymethyl (meth)acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinyl caprolactam, N-vinyl pyrrolidone, phenoxyethyl (meth)acrylate, butoxyethyl (meth)acrylate, pentachlorophenyl (meth)acrylate, pentabromophenyl (meth)acrylatle, polyethylene glycol mono (meth)acrylate, polypropylene glycol mono (meth)acrylate, bornyl (meth)acrylate, methyltriethylene diglycol (meth)acrylate, ancl the compounds represented by the following general formulas (2) to (4):

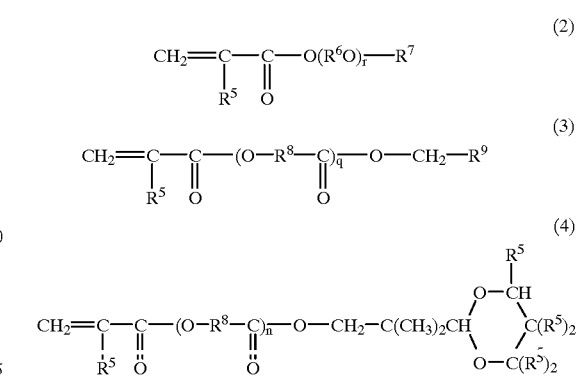

In the above formulas, $R^5$ represents a hydrogen atom or a methyl group. $R^6$ represents an alkylene group with the number of carbon atoms within the range of 2 to 6, preferably 2 to 4. $R^7$ represents a phenylgroup, optionally substituted with an alkyl group with a number of carbons within the range of 1 to 12, preferably 1 to 9. $R^8$ is an alkylene group with a number of carbons within the range of 2 to 8, preferably 2 to 5. r or n is an integer from 0 to 12, preferably 1 to 8. q is an integer from 1 to 8, preferably 1 to 4. $R^9$ is a tetrahydrofuryl group.

Among these mono-functional monomers, isobornyl (meth)acrylate, lauryl (meth)acrylate, and phenoxyethyl (meth)acrylate are especially preferred.

Commercially available mono-functional monomers include Aronix M-101, M-102, M-111, M-113, M-117, M-152, and TO-1210 (Toagosei Chemical Industry Co., Ltd.), KAYARAD TC-110S, R-564, and R-128H (Nippon Kayaku Co., Ltd.), Viscoat 192, Viscoat 220, Viscoat 2311HP, Viscoat 2000, Viscoat 2100, Viscoat 2150, Viscoat 8F, and Viscoat 17F (Osaka Organic Chemical Industry, Ltd.).

Polyfunctional monomers which can be preferably used for the component (C) are ethylene glycol di(meth)acrylate, dicyclopentenyl di(meth)acrylate, triethylene glycol diacrylate, tetra ethylene glycol di(meth)acrylate, tricyclodecanediyldimethylene di(meth)acrylate, tris(2-hydroxyethyl) isocyanurate di(meth)acrylate, tris(2-hydroxyethyl) isocyanurate tri(meth)acrylate, caprolactone-modified tris(2-hydroxyethyl) isocyanurate tri(meth) acrylate, trimethylolpropane tri(meth)acrylate, ethylene oxide (hereinafter also referred to as EO for short)-modified trimethylolpropane tri(meth)acrylate, propylene oxide (hereinafter also referred to as PO for short)-modified trimethylolpropane tri(meth)acrylate, tripropylene glycol di(meth)acrylate, neopentyl glycol di(meth)acrylate, bisphenol A diglycidyl ether with (meth)acrylic acid adducts at both terminals, 1,4-butanediol di(meth)acrylate, 1,6-hexanediol di(meth)acrylate, pentaerythritol tri(meth) acrylate, pentaerythritol tetra(meth)acrylate, polyester di(meth)acrylate, polyethylene glycol di(meth)acrylate, dipentaerythritol hexa(meth)acrylate, dipentaerythritol penta(meth)acrylate, dipentaerythritol tetra(meth)acrylate, caprolactone-modified dipentaerythritol hexa(meth) acrylate, caprolactone-modified dipentaerythritol penta (meth)acrylate, ditrimethylolpropane tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, EO-modified bisphenol F di(meth)acrylate, and (meth)acrylate of phenolnovolac polyglycidyl ether.

Commercially available polyfunctional monomers include SA1002 (Mitsubishi Chemical Corp.); Viscoat 195, Viscoat 230, Viscoat 260, Viscoat: 215, Viscoat 310, Viscoat 214HP, Viscoat 295, Viscoat 300, Viscoat 360, Viscoat GPT, Viscoat 400, Viscoat: 700, Viscoat 540, Viscoat 3000, and Viscoat 3700 (O)saka Organic Chemical Industry, Ltd.); KAYARAD R-526, HDDA, NPGDA, TPGDA, MANDA, R-551, R-712, R-604, R-684, PET-30, GPO-303, TMPTA, THE-330, DPHA, DPHA-2H, DPHA-2C, DPHA-2I, D-310, D-330, DPCA-20, DPCA-30, DPCA-60; DPCA-120, DN-0075, DN-2475, T-1420, T-2020, T-2040, TPA-320, TPA-330, RP-1040, RP-2040, R-011, R-300, and R-205 (Nippon Kayaku Co., Ltd.); Aronix M-210, M-220, M-233, M-240, M-215, M-305, M-309, M-310, M-315, M-325, M-400, M-6200, and M-6400 (Toagosei Chemical Industry Co., Ltd.); Light acrylate EP-4EA, BP-4PA, BP-2EA, BP-2PA, and DCP-A (Kyoeisya Chemical Co., Ltd.); New Frontier BPE-4, TEICA, BR-42M, and GX-8345 (Daiichi Kogyo Seiyaku Co., Ltd.), ASF-400 (Shin Nippon Steel Chemical Co., Ltd.); Repox, SP-1506, SP-1507, SP-1509, VR-77, SP-4010, and SP-4060 (Showa Highpolymer Co., Ltd.); and NK ester A-BPE-4 (Shin-Nakamura Chemical Co., Ltd.).

The component (C) preferably contains at least 60 wt % of a polyfunctional monomer having at least three ethylenically unsaturated groups. It is preferable to use at least 70 wt % of the polyfunctional monomer having at least three ethylenically unsaturated groups in component (C), and is more preferable to use at least 80 wt %. It is, however, especially preferred to use the polyfunctional monomer having at least three ethylenically unsaturated groups in an amount of about 100 wt %. If component (C) substantially consists of one or more monomers containing three or more ethylenically groups, the photocuring property of the prepared resin composition increases, resulting in a decreased change over time of the three-dimensional products (molds) made of the resin composition.

A polyfunctional monomer having three or more functional monomers for this purpose can be selected from any of the above described tri(meth)acrylate compounds tetra (meth)acrylate compounds, penta(meth)acrylate compounds, and hexa(metha)acrylate compounds. Among them, trimethylolpropane tri(meth)acrylate, EO-modified trimethylolpropane tri(meth)acrylate, dipentaerythritol hexa (meth)acrylate, dipentaerythritol penta(meth)acrylate, and ditrimethylolpropane tetra(meth)acrylate are especially preferable.

The above monofunctional and polyfunctional monomers may be used singly or in combinations of two or more, to prepare the component (C).

The component (C) content of the liquid constituent of the resin composition of this invention is within the range of 5 to 30 wt %, preferably, 7 to 25 wt %, and more preferably, 10 to 20 wt %. If the amount of the component (C) is too small, the photocuring properties of the prepared resin composition becomes too low, and hence the three dimensional products (molds) made of the resin composition may not have adequate mechanical strength. On the other hand, if the amount of the component (C) is too large, the prepared resin composition does not have adequate light transmission properties required for light-irradiated laminate fabricating, and, as a result, the mechanical strength such as the tenacity of the three dimensional products (molds) made of the resin composition becomes too low.

(D) Radical Photopolymerization Initiator

The radical photopolymerization initiator (hereinafter also referred to as the component (D)) of the resin composition of this invention is a compound that decomposes by the action of radiation and initiates a radical polymerization reaction of the component (C) by the released radicals.

Radical photopolymerization initiators which can be used for the component (D) include etophenone, acetophenone benzyl ketal, anthraquinone, 1-(4-isopropylphenyl)-2-hydroxy-2-methylpropan-1-one, carbazole, xanthone, 4-chlorobenzo-phenone, 4,4'-diaminobenzophenone, 1,1-dimethoxydeoxy-benzoin, 3,3'-dimethyl-4-methoxybenzophenone, thioxanetione compounds, 2-methyl-1-4-(methylthio) phenyl-2-morpholinopropan-2-one, 2-benzyl-2-dimethylamino-1-(4-morpholinophenyl)-butan-1-one, triphenylamine, 2,4,6-trimethylbenzoyl diphenylphosphine oxides, bis(2,6-dimethoxybenzoyl)-2,4,4-trimethylpentbl phosphone oxide, benzyl methyl ketal, 1-hydroxycyclohexylphenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 3-methylacetophenone, 3,3',4,4'-tetra(t-butylperoxycarbonyl) benzophenone (BTTB), and combination of BTTB and a color sensitizer such as xanthene, thioxanthene, cumarin, and ketocumarin, for example. Among these compound's, benzyl methyl ketal, 1-hydroxycyclohexylphenyl ketone, 2,4,6-trimethylbenzoyl diphenylphosphine oxides, and 2-benzyl-2-dimethylamino-1-(4-morpholinophenyl)-butan-1-one are especially preferable.

The above radical photopolymerization initiators may be used singly or in combinations of two or moreto prepare the component (D).

The component (D) content of the liquid constituent of the resin composition of this invention is within the range of 0.01 to 10 wt % and preferably 0.1 to 8 wt %. If the amount of the component (D) is too small, the radical polymerization rate of the prepared resin composition (curing rate) becomes too low, and hence a longer time is required for laminate fabricating, or the dimensional accuracy decreases. On the other hand, if the amount of the component (D) is too large, the surplus amount of the radical photopolymerization initiator exerts a bad influence on the curing properties of the prepared resin composition and on the mechanical properties, heat resistance, and ease of handling.

(E) Filler

The filler (hereinafter also referred to as the component (E)) of the resin composition of this invention may be any substance without special limitation, but an inorganic substance is preferred from the point of view of the water-resisting capabilities and mechanical properties of the fibrous material forming molds made of the prepared resin composition.

Specifically, silica powder with an average particle size or fiber length of 1 to 50 $\mu$m, such as of fused silica and/or crystal silica is preferably used.

A filler, such as fused and/or crystal silica, of which the powder particles are spherical (0.9 or greater sphericity, for example) is especially preferred, because molds made of the prepared resin composition have good molding properties.

Sphericity, also known as the "degree of circularity", is a ratio that measures the deviation of a spherical object from being a perfect sphere, and is defined by formula 1. When the shape of a projected image is exactly spherical, the sphericity is defined as 1.

$$\text{Sphericity} = \frac{\sqrt{4\pi S_p}}{c} = \frac{d_{pa}}{d_{pc}} \quad (1)$$

wherein $S_p$ is a projection area, c is the peripheral length of the projected image, $d_{pa}$ is the diameter of a circle having the same area as that of the projection area, and $d_{pc}$ is the diameter of a circle having the same peripheral length as the projected image of the particle.

This sphericity can be measured using an image analyzer which can analyze a microphotograph taken by a scanning electron microscope (SEM). The average sphericity can be measured by calculating the average sphericity of 100 particles arbitrarily selected from a multitude of particles appearing in the microphotograph.

Commercially available silica powder products include Crystallite 3K-S, Crystallite NX-7, Crystallite MCC-4, Crystallite CMC-12, Crystallite A-1, Crystallite AA, Crystallite C, Crystallite D, Crystallite CMC-1, Crystallite C-66, Crystallite 5X, Crystallite 2A-2, Crystallite VX-S2, Crystallite VX-SR, Crystallnlte VX-X, Crystallite VX-S, HUSELEX RD-8, HUSELEX RD-120, HUSELEX MCF-4, HUSELEX GP-200T, HUSELEX ZA-30, HUSELEX RD-8, HUSELEX Y-40, HUSELEX E-2, HUSELEX Y-60, HUSELEX E-1, HUSELEX E-2, HUSELEX FF, HUSELEX X, HUSELEX ZA-20, IMSIL A-25, IMSIL A-15, IMSIL A-10, and IMSIL A-8, (Ryushin Co., Ltd.); SUNSPHERE H-31, SUNSPHERE H-32, SUNSPHERE H-51, SUNSPHERE H-52, SUNSPHERE H-121, SUNSPHERE H-122, SUNSPHERE L-31, SUNSPHERE L-51, SUNSPHERE L-121, SUNSPHERE NP-30, SUNSPHERE NP-100, and SUNSPHERE NP-200 (Asahi Glass Co., Ltd.); Silstar MK-08 and MK-15 (Nippon Chemical Industrial Co., Ltd.); FB-48 (Denki Kagaku Kogyo K.K.); Nipsil SS-10, Nipsi:L SS-15, Nipsil SS-10A, Nipsil SS-20, Nipsil SS-30P, Nipsil SS-30S, Nipsil SS-40, Nipsil SS-50, Nipsil SS-50A, Nipsil SS-70, Nipsil SS-100, Nipsil SS-10F, Nipsil SS-50F, Nipsil SS-50B, Nipsil SS-50C, Nipsil SS-72F, Nipsil SS-170X, Nipsil SS-178B, Nipsil E150K, Nipsil E-150J, Nipsil E-1030, Nipsil ST-4, Nipsil E-170, Nipsil E-200, Nipsil E-220, Nipsil E-200A, Nipsil E-1009, Nipsil E-220A, Nipsil E-1011, NipsilE-K300, Nipsil HD, Nipsil HD-2, Nipsil N-300A, Nipsil L-250, Nipsil G-300, Nipsil E-75, Nipsil E-743, and Nipsil E-74P (Nippon Silica Industry, Ltd.), for example.

Inorganic filler substances other than silica powder include, glass powder, alumina, alumina hydrate, magnesium oxide, magnesium hydroxide, barium sulfate, calcium sulfate, calcium carbonate, magnesium carbonate, silicate mineral, diatomaceous earth, silica sand, silica powder, oxidation titanium, aluminum powder, bronze, zinc powder, copper powder, lead powder, gold powder, silver dust, glass fiber, titanic acid potassium whiskers, carbon whiskers, sapphire whiskers, verification rear whiskers, boron carbide whiskers, silicon carbide whiskers, and silicon nitride whiskers.

Commercially available inorganic filler products include Glass bead GB210, GB210A, GB210B, GB210C, GB045Z, GB045ZA, GB045ZB, GB045ZC, GB731, GB731A, GB731B, GB731C, GB731M, GB301S, EGB210, EGB210A, EGB210B, EGB210C, EGB045Z, EGB045ZA, EGB045ZB, EGB045ZC, MB-10, MB-20, EMB-10, EMB-20, HSC070Q, HSC-024X, HSC-080S, HSC-070G, HSC-075L, HSC-110, HSC-110A, HSC-110B, and HSC-110C (Toshiba Balotini Co., Ltd.); Radiolite #100, Radiolite Fine Flow B, Radiolite Fine Flow A, Radiolite Sparkle Flow, Radiolite Special Flow, Radiolite #300, Radiolite #200, Radiolite Clear Flow, Radiolite #500, Radiolite #600, Radiolite #2000, Radiolite #700, Radiolite #500S, Radiolite #800, Radiolite #900, Radiolite #800S, Radiolite #3000, Radiolite Ace, Radiolite Superace, Radiolite High Ace, Radiolite PC-1, Radiolite Delux P-5, Radiolite Delux W50, Radiolite Microfine, Radiolite F, Radic)lite SPF, Radiolite GC, Topco #31, Topco #34, Topco #36, Topco #38, and Topco #54 (Showa Chemical Industry Co., Ltd.); Higilite H-X, Higilite H-21, Higilite H-31, Higilite H-32, Higilite H-42, Higilite H-42M, Higilite H-43, Higilite H-32ST, Higilite H-42STV, Higilite H-42T, Higilite H-34, Higilite H-34HL, Higilite H-32I, Higilite H-42I, Higilite H-42S, Higilite H-210, Higilite H-310, Higilite H-320, Higilite H-141, Higilite H-241, Higilite H-341, Higilite H-3201, Higilite H-320ST, Higilite HS-310, Higilite HS-320, Higilite HS-341, Alumina A-426, alumina A-42-1, Alumina A-42-2, Alumina A-42-3, Alumina A-420, Alumina A-43M, Alumina A-43-L, Alumina A-50-K, Alumina A-50-N, Alumina A-50-F, Alumina AL-45-H, Alumina AL-45-2, Alumina AL-45-1, Alumina AL-43-M, Alumina AL-43-L, Alumina AL-43PC, Alumina AL-150SG, Alumina AL-170, Alumina A-172, Alumina A-173, Alumina AS10, Alumina AS-20, Alumina AS-30, Alumina AS-40, and Alumina AS-50 (Showa Denko K.K.); Starmague U, Starmague M, Starmague L, Starmague P, Starmague C, Starmague CX, High purity magnesia HP-10, High purity magnesia HP-10N, High purity magnesia HP-30, Star brand-200, Star brand-10, Star brand-10A, Star brand magnesium carbonate Venus, Star brand magnesium carbonate two stars, Star brand magnesium carbonate one star, Star brand magnesium carbonate S, Star brand magnesium carbonate Fodder, Star brand heavey magnesium carbonate, High purity magnesium carbonate GP-10, High purity magnesium carbonate 30, Star brand light calcium carbonate general use, Star brand light calcium carbonates EC, and Star brand light calcium carbonate KFW-200 (Konoshima Chemical Industry Co., Ltd.); MKC Silica GS50Z and MKC Silica SS-15 (Mitsubishi Chemical Corp.), Admafine SOE-E3, Admafine SO-C3, Admafine AO-800, Admafine AO-809, Admafine AO-500, and Admafine AO-509 (Adomatex Co., Ltd.); M. S. GEL D-560A, M. S. GEL D-5120A, M. S. GEL D-5300A, M. S. GEL D-2060A, M. S. GEL D-20120A, M. S. GEL D-20-300A, SILDE-X H-31, SELDEX H-32, SILDEX H-51, SILDEX H-52, SILDEX H-121, SILDEX H-122, SILDEX L-31, SILDEX L-51, SILDEX L-121, SILD EX F-51, and SILDEX F-121 (Asahi Glass); SYLYSIA 250, SYLYSIA 250N, SYLYSIA 256, SYLYSIA 256N, SYLYSIEA 310, SYLYSIA 320, SYLYSIA 350, SYLYSIA 358, SYLYSIA 430, SYLYSIA 431, SYLYSIA 440, SYLYSIA 450, SYLYSIA 470, SYLYSIA 435, SYLYSIA 445, SYLYSIA 436, SYLYSIA 446, SYLYSIA 456, SYLYSIA 530, SYLYSIA 540, SYLYSIA 550, SYLYSIA 730, SYLYSIA 740, SYLYSIA 770, SYLOPHOBIC100, and SYLOPHOBIC 200 (Fuji Silysia Chemical Co., Ltd.); and Tismo-D, Tismo-L, Tofica Y, Tofica YN, Tofica YB, Dendol WK-200, Dendol WK-200B, Dendol WK-300, Dendol BK-200, Dendol BK-300, Swanite, and Barihigh B Super Dendol(Otsuka Chemical Co., Ltd.).

The condition of the surface of the particles of the filler used and the impurities contained in filler from the manufacturing process can affect the curing reaction of the resin composition. In such cases, it is preferable to wash the filler particles or coat the particles with an appropriate primer as a method of improving the curing properties.

These inorganic fillers may also be surfacetreated with a silane coupling agent. Silane coupling agents which can be used for this purpose include vinyl triclorosilane, vinyl tris (β-methoxyethoxy) silane, vinyltriethoxy silane, vinyltrimethoxy silane, γ-(methacryloxypropyl) trimethoxy silane, β-(3,4-epoxycyclohexyl)ethyltrimethoxy silane, γ-glycydoxypropyltrimethoxy silane, γ-glycydoxypropylmethyl diethoxy silane, N-β(aminoethyl) yaminopropyltrimethoxy silane, N-β-(aminoethyl)-γ-aminopropylmethyldimethoxy silane, γ-aminopropyltriethoxysilane, N-phenyl-γ-amino propyl trimethoxy silane, γ-mercaptopropyl trimethoxysilane, and γ-chloropropyltrimethoxy silane.

The above inorganic fillers may be used singly or in combination of two or more to make up the component (E). By using inorganic fillers with different properties in combination, it is possible to impart the desirable properties derived from the fillers to the prepared resin composition. Further, the prepared resin composition can have a remarkably different fluidity if the grain size or fiber length distribution of the inorganic filler used is different, though the substance, the average grain size or fiber length, and the amount are the same. Therefore, by appropriately determining not only the average grain size or fiber length but also the grain size or fiber length distribution, or by using inorganic fillers of the same substance with different average grain sizes or fiber lengths in combination, the necessary amount of the filler and the fluidity and other properties of the prepared resin can be controlled as desired.

The component (E) content of the resin composition of this invention is within the range of 30 to 80 wt % and more preferably 50 to 70 wt % of the total composition. If the amount of the component (E) is too small, the waterresistant properties and the durability of the molds made of the prepared resin composition do not increase sufficiently. Further, the viscosity of the prepared resin composition becomes too low, causing precipitation of the filler. On the other hand, if the amount of the component (E) is too large, the fluidity of the prepared resin composition becomes too low, rendering the resin composition difficult to handle. The excessive amount of the component (E) can also affect the time needed for laminate fabricating of the resin composition, causing the time to increase.

Organic fillers which can be used for the component (E) are high crosslinked organic substances such as rubber and resin.

Optional Constituents and Additives

The resin composition of this invention may contain optional constituents other than the constituents (A) to (E) described above, within the limits that do not impair the photocuring properties of the resin composition. The optional constituents include photosensitizer (polymerization promctors) consisting of amine compounds such as triethanolamine, methyl diethanolamine, triethylamine, and diethylamine; photosensitizers consisting of thioxanethone, derivatives of thioxanethone, anthraquinone, derivatives of anthraquinone, anthracene, derivatives of anthracene, perylene, derivatives of perylene, benzophenone, benzoin isopropyl ether; and reactive diluents such as vinyl ether, vinyl sulfide, vinyl urethane, urethane acrylate, and vinyl urea, for example.

The resin composition of this invention may also contain various kinds of additives. Examples of suitable additives include resins or polymers such as epoxy resin, polyamide, polyamideimide, polyurethane, polybutadiene, polychloroprene, polyether, polyester, styrene/butadiene styrene block copolymer, petroleum resin, xylene resin, ketone resin, cellulose resin, fluorine containing oligomer, and silicon containing oligomer; polymerization inhibitors such as for example phenothiazine, and 2,6-ditbutyl-4-methyl phenol; polymerization initiation assistants, leveling agents, wettability improvers, surfactants, plasticizers, UV absorbers, silane coupling agents, resin particles, pigment, and dyes.

The resin composition of this invention is prepared by mixing the above described constituents (A) to (D), optional constituents, and additives into a homogenous resin solution (liquid constituent) and then dispersing the component (E) in the liquid constituent.

The viscosity (at 25° C.) of the thusprepared resin composition is preferably within the range of 500 to 20,000 cps, and more preferably within the ,ange of 2,000 to 8,000 cps.

Fibrous Material Forming Mold

The resin composition of this invention is suited as a photocurable resin composition used for manufacturing fibrous material forming molds by optical fabricating. A fibrous material forming mold, made of laminated layers of cured resin in a desired shape, can lo be formed of the resin composition of this invention by repeating the process which selectively irradiates a thin layer of the resin composition overlaid on the previous layer with radiant energy such as visible light, ultraviolet light, and infrared light.

Specifically, the resin composition of this invention is supplied on an appropriate supporting stage to form a thin layer (1) of the resin composition over the stage. The thin layer (1) is selectively irradiated with light, and becomes a solid cured resin layer (1). Next, the resin composition is supplied on the cured resin layer (1) to form a thin layer (2) of the resin composition over the cured resin layer (1). The thin layer (2) of the resin composition is then selectively irradiated with light, and becomes a cured resin layer (2) which is superposed on and firmly united with the cured resin layer (1). By repeating this process, changing or not changing the pattern of light irradiation, a fibrous material forming mold in a threedimensional shape is formed of a plurality of cured resin layers which are united into a solid body.

With the use of this optical fabricating method, suction holes can be formed by aligning the unexposed parts of all laminated layers so that the uncured resin can be removed so continuous holes are formed. Since suction holes are formed in this manner by the optical fabricating method, the diameter and pitch of the suction holes can be freely selected as desired. For example, suction holes with a diameter smaller than the length of the pulp fibers (1 mm or smaller in diameter, for example) can be easily formed.

There are no particular requirements for the means for selectively irradiating the resin composition of this invention with radiation. Various means can be used. For example, (1) a means which selectively irradiates the resin composition with light by scanning with a laser light beam or light beam focused with lenses and mirrors, with the light being switched on and off, (2) a means which selectively irradiates the resin composition with nonconvergent light through a mask with a pattern of transparent parts predetermined for each layer, and (3) a means which selectively irradiates the resin composition with light beams transmitted through a light guiding means consisting of a large number of bundled optical fibers. For the means which selectively irradiates the resin composition with nonconvergent light through a mask, a liquidcrystal shutter device, each element area of which can be selectively switched between the opaque and transparent states, can be used. When the mold to make has a complicated shape or require a high dimensional accuracy, a irradiating means using a scanning laser light beam is preferable.

Figure 3:
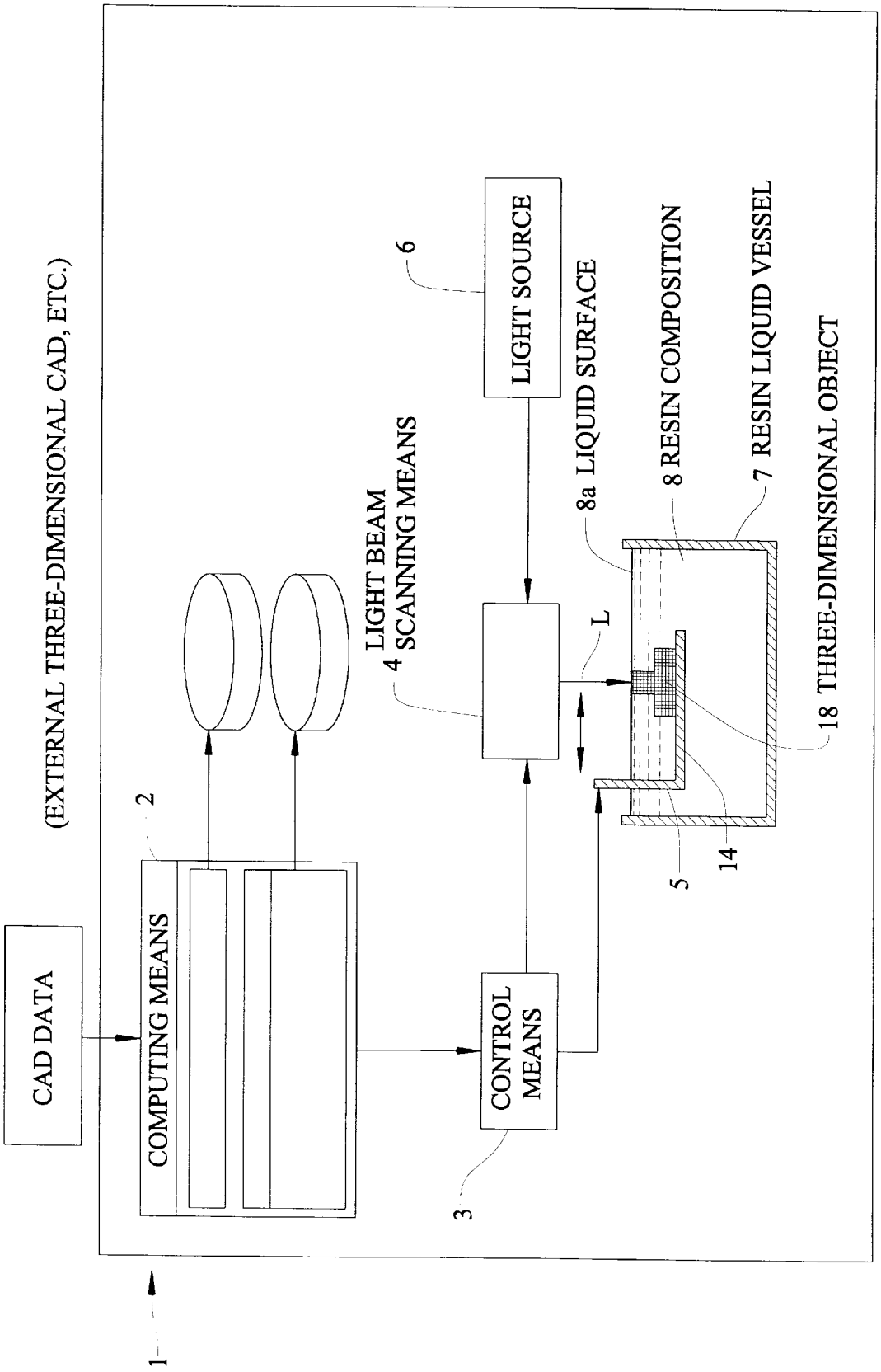
FIG. 3 is an optical fabricating apparatus suited for manufacturing the fibrous material forming mold of this invention.

FIG. 3 is a schematic diagram of the structure of an optical fabricating apparatus which is suited for manufacturing the fibrous material forming mold of this invention. An optical fabricating apparatus 1 comprises a computing means 2, a control means 3, a light beam scanning means 4, a moving mechanism 5, a light source 6, and a resin liquid vessel 7.

The computing means 2 generates control information such as contour section data and other manufacturing parameter data from the shape of the mold and the properties of the resin composition used. Control information is sent to the control means 3, and the control means 3 controls the light beam scanning means 4 and the moving mechanism 5. The light beam scanning means 4 scans a light beam L from the light source 6 such as an argon laser over the desired region of the surface 8a of the resin composition 8 held in the resin liquid vessel 7 under the control of the control means 3. The moving mechanism 5 lowers the stage 14 by a predetermined distance each time a layer of cured resin is formed.

With the use of this optical fabricating apparatus 1, a three dimensional object (fibrous material forming mold of this invention) can be formed in the resin liquid vessel 7 by repeating the process which cures the thin layer of the resin composition 8 at the surface 8a in a required two-dimensional shape and the operation which lowers the stage 14 by the moving mechanism 14 by a predetermined step.

The thus-obtained fibrous material forming mold is next subjected to a process which removes the unexposed resin composition remaining on the surface, and is then subjected to a washing process as necessary. For this washing, organic solvents represented by alcohol such as isopropyl alcohol and ethyl alcohol, esters such as ethyl acetate, and ketones such as acetone and methyl ether, aliphatic system organic solvents represented by terpene and glycol ester, a low-viscosity thermosetting resin composition, and an photocurable resin composition can be used as the washing agent.

To obtain a fibrous material forming mold with a smoother surface, it is preferable to post-cure the mold by heat treatment or light irradiation according to the type of resin composition used after the above washing. This post-curing process can cure not only the resin composition on the surface of the mold, but also the uncured resin composition remaining inside the mold. It is therefore preferable to perform the postcuring process after washing with an organic solvent.

Figure 4:
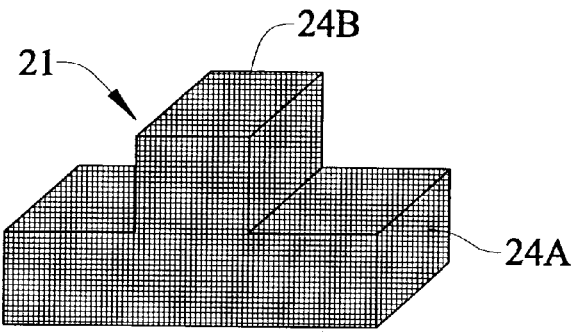
FIG. 4 is a perspective view of the fibrous material forming mold of this invention.
Figure 5:
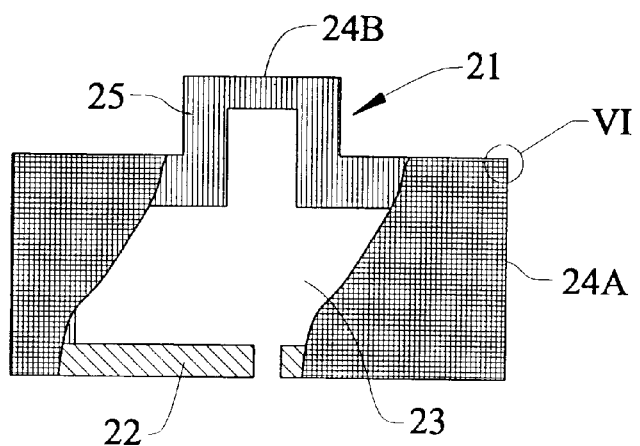
FIG. 5 is a partial sectional side view of the fibrous material forming mold shown in FIG. 4.
Figure 6:
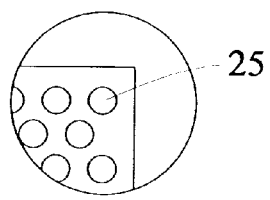
FIG. 6 is an enlarged sectional view of section VI of FIG. 5.

FIG. 4 is a perspective view of an example of the fibrous material forming mold of this invention. FIG. 5 is a partial sectional side view of the fibrous material forming mold shown in FIG. 4. In FIGS. 4 and 5, 21 indicates the mold main body, 22 the lid, 23 the inside space, 24A the vertical molding surface, 24B the horizontal molding surface, and 25 suction holes by which the inside space 23 communicates with the outside.

The fibrous material forming mold shown in FIGS. 4 and 5 is a mold for forming a fibrous material with a freeness value within the range of 400 to 600 ml and a fiber length within the range of about 0.3 to 3 mm (pulp fibers, plant fibers, metal fibers, and so on), for example.

Here, the freeness value is a numerical value indicating water drainability (a measure of the ease of water drain from fibers) that is measured according to the method specified by JIS P 8121, TAP PI T227, ISO 5267/1~2, and SCAN M3 and 4.

The diameter of the suction holes in the vertical molding surface 24A is preferably 3.6 mm or smaller, and more preferably 0.3 to 1.4 mm. The diameter of the suction holes in the horizontal molding surface 24B is preferably 3.0 mm or smaller, and more preferably 0.3 to 1.2 mm.

Example

An example of this invention is described below.
(1) Resin Composition Preparation:

A homogeneous resin solution (liquid constituent) was prepared by mixing the following compounds and agitating the mixture for two hours at 40° C:

3,4-Epoxycyclohexylmethyl-3',4'-epoxycyclohexane carboxylate (component (A): UVR-6110, manufactured by Union Carbide Corp.) 23.0 parts by weight Butanediol diglycidyl ether (component (A): Araldite DY-220, manufactured by Ciba Geigy) 8.6 parts by weight Triaryl sulfonium hexafluoroantimonate photopolymerization initiator(component (B)):

SP-171, manufactured by Asahi Denka Kogyo K.K.) 0.95 parts by weight

Trimethylolpropane triacrylate (component (C):

VISCOAT-295, manufactured by Osaka Organi Chemical Ind. Co., Ltd.) 3.9 parts by weight Dipentaerythritol hexacrylate (component (C): KAYARAD DPHA, manufactured by Nippon Kayau Co., Ltd.) 2.4 parts by weight 1-Hydroxycyclohexylphenyl ketone (component (D): Irgacure184, manufactured by Ciba Geigy) 0.95 parts by weight β-(3,4-Epoxycyclohexyl)ethyltrimethoxy silane (silane coupling agent: Silace S530 (manufactured by Chisso Corp.) 0.60 parts by weight Next, 59.6 parts by weight of silica beads (component (E), SUNSPHERE NP-100 (manufactured by Ashahi Glass Co., Ltd.) was added to the resin solution and dispersed in the solution using a homogenizer at room temperature. The resin composition of this, invention was thus prepared. In this process, the surface of the silica beads was treated with β-(3,4-epoxycyclohexyl)ethyltrimethoxy silane simultaneously. The viscosity of the resin composition was measured as 4,800 cps (at 25° C.). A test sample was made by curing the resin composition, and the Young's modulus was measured. The Young's modulus was ,710 kg/mm$^2$.
(2) Mold Formation The fibrous material forming mold of this invention in the shape shown in FIGS. 4 and 5 was formed of the resin composition (filler content: 59.6 wt %) prepared in the above step (1) with the use of an optical fabricating apparatus SOLID CREATOR JSC-2000 (manufactured by Sony Corporation) shown in FIG. 3. The diameter of the suction holes open in the vertical forming surface 24A was 0.8 mm, and that of the suction holes open in the horizontal forming surface 24B was 0.5 mm.
(3) Test of the Mold Preforming of pulp fibers was conducted 100,000 times consecutively by means of the fibrous material forming mold formed in step (2). The freeness value of the pulp fibers in the raw pulp suspension in which the mold was placed was within the range of 400 to 600 ml, and the length of the pulp fibers was within the range of 2 to 3 mm. Preforms of pulp fibers were inspected after 100,000 preform operations, and no problem was found with the preforms. There was also no decrease in strength of the mold caused by absorption of water.

Example for Comparison

A resin composition for comparison, which was composed of only the resin solution (liquid constituent), was prepared in the same manner as step (1) of Example 1 except that the silane coupling agent was not used and the silica beads were not dispersed in the composition.

Next, a fibrous material forming mold was formed of the resin composition in the same manner as in step (2) of Example 1. Then, preforming of pulp fibers was repeated in the same manner as in step (3) of Example 1. A degradation, specifically decrease of dimensional accuracy, was found in the 30th preform. A decrease in strength of the mold caused by absorption of water also occurred, and the mold broke during the 45th preform.

With the use of the resin composition of this invention, it becomes possible to manufacture a fibrous material forming mold having a large number suction holes of a desired diameter easily and efficiently. It also becomes possible to quickly respond to a design change and an additonal order.

Further, since the fibrous material forming mold of this invention is made of a cured resin with high waterresistant properties, the decrease in strength of the mold caused by absorption of water is small if the mold is placed in the raw pulp suspension for a long time. Therefore, the mold has high durability with which it can endure repeated use over a long time.

What is claimed is:

1. A radiation curable resin composition, comprising:
   (i) a liquid constituent comprising:
      (A) 30–95 wt %, based on total weight of said liquid constituent, of a cationic polymerizable organic component composed of 50 wt. or more of an epoxy compound selected from the group consisting of 3,4-epoxycyclohexylmethyl-3',4'-epoxycyclohexane carboxylate and bis(3,4-epoxycyclohexylmethyl) adipate;
      (B) 0.110 wt %, based on total weight of said liquid constituent, of a cationic photopolymerization initiator that is an onium salt;
      (C) 5–30 wt %, based on total weight of said liquid constituent, of a ethylenically unsaturated monomer component composed of 60 wt % or more of a polyfunctional monomer having three or more ethylenically unsaturated groups; and
      (D) 0.01–10 wt %, based on total weight of said liquid constituent, of a radical photopolymerization initiator; and
   (ii) 50–80 wt %, based on total weight of the composition, of an inorganic or organic filler.

2. The composition of claim 1, wherein said onium salt is a hexafluoroantimonate onium salt.

3. The composition of claim 1, wherein said filler is a powder having spherical particles.

4. The composition of claim 1, wherein said filler is composed of silica beads.

5. The composition of claim 1, wherein said filler is surface treated with a silane coupling agent.

6. The composition of claim 1, wherein said composition further comprises a silane coupling agent.

7. The composition of claim 1, wherein the inorganic filler is selected from fused silica, crystal silica, or a mixture of fused silica and crystal silica.

8. The composition of claim 1, wherein the organic filler is selected from rubbers, resins or a mixture of rubbers and resins.

* * * * *

UNITED STATES PATENT AND TRADEMARK OFFICE
CERTIFICATE OF CORRECTION

PATENT NO.  : 6,013,714
DATED       : January 11, 2000
INVENTOR(S) : Haruta et al.

It is certified that error appears in the above-identified patent and that said Letters Patent is hereby corrected as shown below:

Column 18,
Line 1, delete "0.110" and insert therefor -- 0.1-10 --.

Signed and Sealed this

Twenty-fourth Day of September, 2002

Attest:

Attesting Officer

JAMES E. ROGAN
Director of the United States Patent and Trademark Office